(12) United States Patent
Williams

(10) Patent No.: US 7,571,468 B1
(45) Date of Patent: Aug. 4, 2009

(54) PERSONAL AUTHORISATION DEVICE

(75) Inventor: Emrys J. Williams, Milton Keynes (GB)

(73) Assignee: Sun Microsystems, Inc., Santa Clara, CA (US)

( * ) Notice: Subject to any disclaimer, the term of this patent is extended or adjusted under 35 U.S.C. 154(b) by 565 days.

(21) Appl. No.: 10/818,988

(22) Filed: Apr. 6, 2004

(51) Int. Cl.
*G06F 21/00* (2006.01)

(52) U.S. Cl. ............................ 726/9; 713/184; 713/185; 726/17

(58) Field of Classification Search .................. None
See application file for complete search history.

(56) References Cited

U.S. PATENT DOCUMENTS

| | | | | |
|---|---|---|---|---|
| 5,363,449 | A * | 11/1994 | Bestock ........................ | 705/72 |
| 5,457,440 | A | 10/1995 | Daddono | |
| 5,742,233 | A | 4/1998 | Hoffman et al. | |
| 6,173,172 | B1 * | 1/2001 | Masuda et al. ............... | 455/410 |
| 6,239,700 | B1 | 5/2001 | Hoffman et al. | |
| 6,323,762 | B1 * | 11/2001 | Ekpo, Jr. .................. | 340/426.35 |
| 6,408,388 | B1 * | 6/2002 | Fischer ........................ | 713/176 |
| 6,624,754 | B1 | 9/2003 | Hoffman et al. | |
| 6,695,207 | B1 * | 2/2004 | Norris, Jr. .................... | 235/382 |
| 6,894,617 | B2 | 5/2005 | Richman | |
| 7,028,191 | B2 * | 4/2006 | Michener et al. ............ | 713/182 |
| 2003/0208681 | A1 * | 11/2003 | Muntz et al. ................. | 713/179 |

\* cited by examiner

*Primary Examiner*—Gilberto Barron, Jr.
*Assistant Examiner*—Martin Jeriko P San Juan
(74) *Attorney, Agent, or Firm*—Robert C. Kowert; Meyertons, Hood, Kivlin, Kowert & Goetzel, P.C.

(57) ABSTRACT

A personal authorisation device wearable by a user includes an input operable to receive data for authenticating a user, a memory operable to store validation information derived from the user authentication data, and an output operable to provide an authorisation code. The device further includes a tamper detector that triggers if the device is removed from its wearer. Triggering of the tamper detector serves to disable use of the device.

34 Claims, 6 Drawing Sheets

PERSONAL AUTHORISATION DEVICE

FIELD OF THE INVENTION

The present invention relates to a personal authorisation device, and in particular to such a device that is wearable by a user.

BACKGROUND OF THE INVENTION

A pass code represents a string of symbols or characters for providing controlled access to a resource. A pass code is known to an individual or group of individuals authorised to access the resource. A copy of the pass code is stored in a security system that protects the resource. When an individual desires to use the resource, he or she enters the pass code into the security system, which checks that the entered pass code matches the stored pass code. Assuming that there is a match, the security system grants the user access to the resource.

FIGS. 1A, 1B, 1C, and 1D represent a variety of situations in which pass codes are used. In FIG. 1A, a user 101 enters a pass code into a terminal 110. Typically terminal 110 is provided with a keypad for this purpose, with the pass code comprising a short string of digits. Such terminals are frequently used to control access to buildings, car parks, and so on. Note that in many cases there is a single pass code that is shared by all users. This pass code is stored in the terminal, and the terminal compares the input from user 101 with the stored pass code in order to validate the user.

FIG. 1B illustrates a variation on FIG. 1A, where the user 101 has a card 102 (and will therefore be referred to as card holder 101B). Card 102 may comprise a smart card with an embedded chip typically incorporating a processor and non-volatile storage. This non-volatile storage is used to hold a pass code in the form of a personal identification number (PIN) for card holder 101B.

In order to use terminal 110, card holder 101B typically engages card 102 into terminal 110, and then enters the PIN for the card. The terminal 110 forwards the user-entered PIN to the card 102 (possibly in encrypted form), where it is compared to the PIN stored on the card. If there is a match, the card holder 101B is assumed to be properly authorised, and so the transaction is allowed to proceed. Note that the converse procedure could also be employed, where the card 102 forwards its stored PIN to the terminal 110, and where it is the terminal that then performs the authorisation comparison between the stored PIN and the user-entered PIN.

Card 102 may be used in the configuration of FIG. 1B as a form of purse for payment purposes. A terminal 110 can be used to load the purse, by feeding cash into the terminal 110, with the cash then being loaded onto the card. Another (or possibly the same) terminal 110 then allows purchases using card 102, where the terminal deducts money for a purchase from the balance on card 102.

FIG. 1C illustrates a configuration where terminal 110 is indicated as being a client system 110C connected by a network 120 to a server 130C. In one example, client system 110C may comprise a desktop personal computer. Network 120 can be any form of wired and/or wireless communications network, such as the Internet, a local area network (LAN), a wide area network (WAN), a mobile phone network, and so on.

The configuration of FIG. 1C might correspond to providing on-line access to an account held on server 130C, such as for email, home banking, Internet betting, and so on. Typically the account is accessed by user 101 providing a user ID to specify the particular account in question, and a pass code, which controls access to the specified account. The pass code is normally in the form of a password comprising an alphanumeric string. The user enters the password into client 110C. The password is then transferred across network 120 to server 130, where it is compared against a stored password for the account. If a match is obtained, the server 130C allows the client 110C to manipulate the account, e.g. to read emails, transfer funds, etc, depending upon the nature of the account.

FIG. 1D illustrates a configuration where card holder 101D uses card 102 to access terminal 110, which in turn is linked to a server 130D via network 120. The configuration of FIG. 1D may correspond to a cash supply system, in which terminal 110 is an automated teller machine (ATM) connected via a private (secure) link 120 to server 130 that maintains account records for card holder 101D. It may also correspond to a conventional credit card purchase, where card 102 is a credit card, and terminal 110 is typically located in some merchant store. Terminal 110 is then connected over network 120 (which may be in the form of a dial-up link) to server 130D.

In one implementation of FIG. 1D, card 102 contains an identifier of user 101D, but not the pass code (PIN). Thus in use, card 102 is typically inserted into or swiped through terminal 110, which allows the terminal 110 to access the account number from card 102. The card holder 101D is then prompted to enter the PIN into terminal 110. The PIN and the account number are transmitted to server 130 for verification. Server 130 confirms that the PIN entered by card holder 101D matches that stored in the server 130 in respect of the account identified by card 102. This model is generally used for ATM transactions.

In another implementation of FIG. 1D, the user pass code is stored on card 102 itself. In this case, the PIN entered by the user can be verified directly against the PIN stored on the card 102, in analogous fashion to that described above for FIG. 1B. Note that in this embodiment, the PIN need not be transferred to the server 130D, since the PIN authorisation has already been performed within card 102. Nevertheless, terminal 110 may still send the PIN to server 110, for example to provide an additional security layer against fraudulent use of card 102 (e.g. for audit purposes). The terminal 110 might also ask the server 130D to confirm that the account is still active (e.g. card 102 has not been stolen) and that the account has sufficient funds for the intended transaction (although this can be done without the server having to receive the PIN).

One problem with the use of pass codes is that they are vulnerable to interception at the point of user entry. One possible attack is to use a "sniffer" program that tracks all inputs to a terminal or other input device. If a customer enters a PIN into a terminal, this may potentially be picked up by such a sniffer program and reported to an adversary. Desktop computers are especially susceptible to this type of attack, given that they are liable to infection by foreign software, for example a virus or a worm, that may act as the sniffer program.

Another vulnerability for pass codes is that an adversary may simply observe a user entering a pass code into a terminal. Since the pass code is often quite short (typically four digits for a PIN), and is entered for each new transaction, it is not difficult in practice for an adversary to acquire knowledge of a pass code through observation in this manner. This is especially true if the pass code is being entered at a public location, such as a supermarket check-out, where it is very difficult to conceal hand movements for keypad entry. The problem is exacerbated by the growing availability of high quality miniature video cameras, which can be used to video PIN entry in a covert manner. Nevertheless, PINs are being increasingly relied upon for transactions involving credit and debit cards in place of conventional signatures.

One way to avoid a user having to enter a PIN for authorisation purposes is by storing a user pass code on a card 102. The pass code from the card can then be transferred to and verified by a terminal 110 (such as in FIG. 1B), or a server 130D (such as in FIG. 1D). In this model, possession of an appropriate card in effect validates the user, so that there is no further requirement for the user to enter a pass code. This is analogous to the situation with a conventional (physical) key for use in a door lock. Indeed, many hotels now use cards rather than keys to control access to guest rooms. A card may also be provided with some property to link it to the legitimate user. For example, the card may carry a photograph of the user, such as with an identification badge.

Using a stored pass code on a card in this manner does not require user entry of a pass code at authorisation time. Therefore, the risk of the pass code being compromised or intercepted at the point of entry is avoided. On the other hand, if a card is lost or stolen, the card may be used to provide authorisation for an illicit party. Thus with this approach, an adversary no longer needs to acquire both a card and also a separate validating pass code in order to gain access to a protected resource, since the pass code is (in effect) packaged onto the card already.

In summary, known authorisation techniques such as the pass code entry mechanisms described above all suffer from some form of vulnerability to attack by an adversary.

SUMMARY OF THE INVENTION

Accordingly, one embodiment of the invention provides a personal authorisation device wearable by a user. The device comprises an input to receive data for authenticating a user; a memory to store validation information derived from the user authentication data; and an output to provide an authorisation code. The device further comprises a tamper detector that triggers if the device is removed from its wearer. Triggering of the tamper detector serves to disable use of the device. The device may be implemented, for example, as a necklace, a bracelet, or a wristwatch, and can be used for authorisation in a very wide variety of circumstances, such as those described above.

In one embodiment, the user authentication data received at the input undergoes a transformation by a one-way function. If the user authentication data is to be stored in the device, this reduces the risk of an adversary being able to discern the user authentication data to enter into the device for authorisation by looking at stored data within the device.

The tamper detector may disable the device by deleting the validation information stored in the memory. Accordingly, a user then has to re-enter the user authentication data in order for the device to become usable again. In one embodiment, the validation information comprises a status indication based on validating the transformed user authentication data against a pass code stored in the device. The status information, which is generally yes/no, determines whether or not the device will produce any output. In another embodiment, the validation information comprises the transformed user authentication data. In this case, the device may always produce an output, but this may be dependent upon the stored validation information (so that if this validation information is changed, the output becomes incorrect—i.e. unauthorised).

In one embodiment, the device further comprises a timer, where expiry of the timer serves to disable use of the device. The timer may for example disable use of the device by deleting the stored validation information in the memory or by preventing the output providing the authorisation code. The timer may be reset when new authentication data is received at the input. In one embodiment the timer has a duration of approximately one day, thereby requiring a pass code to be (re)entered at least on a daily basis.

In one embodiment, the device stores multiple authorisation codes, and is operable to provide or not provide one of the multiple authorisation codes as output in accordance with said validation information. Another possibly is that the device is indeed operable to provide one of the multiple authorisation codes as output, but a stored authorisation code is transformed based on the validation information prior to output from the device. As mentioned above, in this case if the validation information is changed, the (transformed) output authorisation code becomes incorrect (unauthorised).

In one embodiment, the device further comprises a timer that is set whenever user authentication data is received at the input. This then renders the tamper detector inoperable to disable use of the device until expiry of the timer. The timer may have an expiry period of approximately a few seconds, which allows time (for example) for a user to put the device on immediately after entering the authentication data but without triggering the tamper detector.

The input mechanism may be adapted to suit the particular device. One possibility is that input is via a wireless interface. Another possibility is that input is via a set of buttons (such as on a wristwatch). In addition, there are various possible implementations of the tamper detector. In one embodiment, this includes an electric circuit, where the tamper detector triggers if the circuit is broken to remove the device from the wearer. The electric circuit may be arranged to loop around the wearer's wrist.

In accordance with another embodiment of the invention, there is a method of providing an authorisation code from a personal authorisation device wearable by a user. The method comprises entering user authentication data into the personal authorisation device, storing validation information derived from the user authentication data in the device, and providing an authorisation code as output from the device. The method further comprises detecting if the device is removed from the user wearing the device, and disabling use of the device in response to detecting such removal.

It will be appreciated that the method embodiments of the invention will generally benefit from the same particular features as the device embodiments of the invention described herein.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 1A:
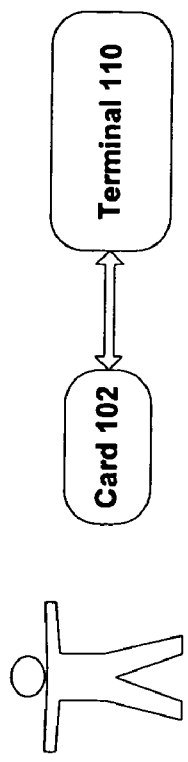
FIGS. 1A, 1B, 1C, and 1D are schematic diagrams illustrating various instances in which a pass code may be used.
Figure 1B:
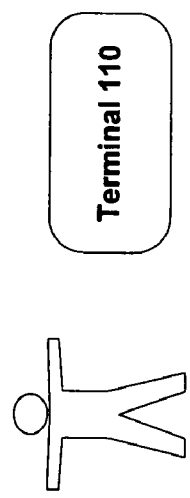
Figure 1C:
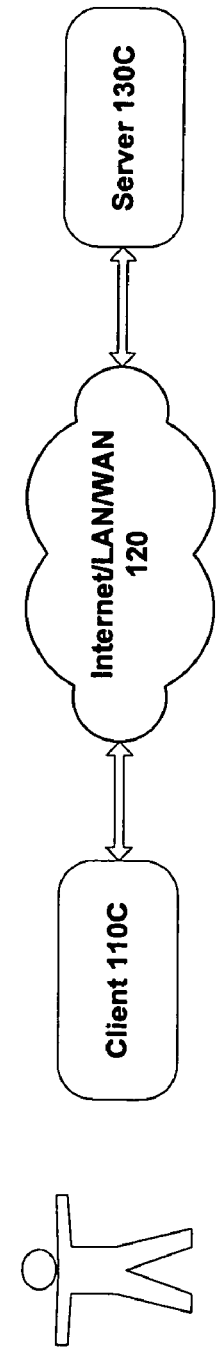
Figure 1D:
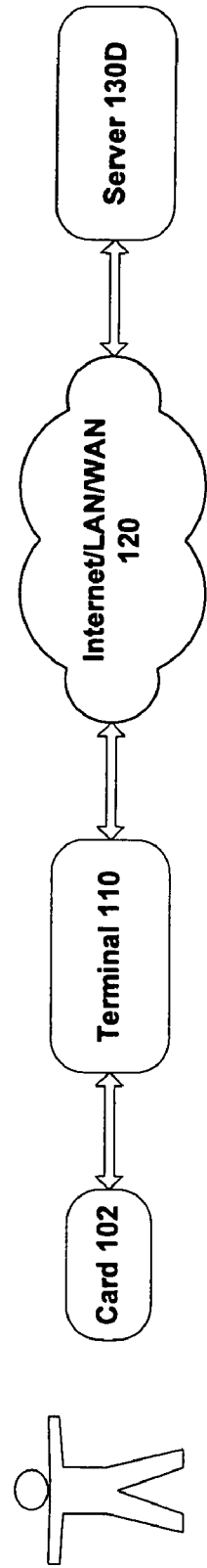
Figure 2:
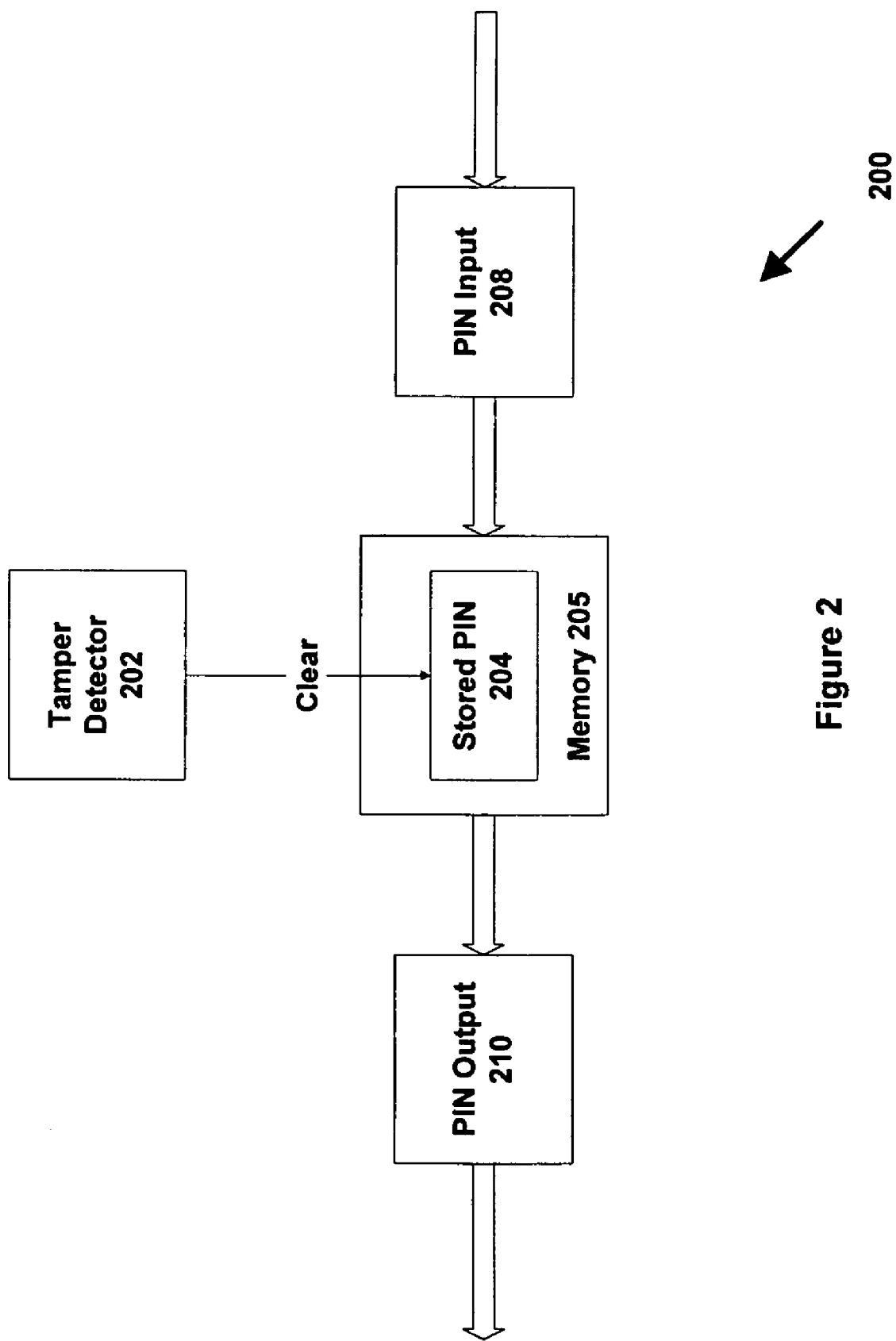
FIG. 2 is a schematic diagram of a personal authorisation device in accordance with one embodiment of the invention.

FIG. 2 is a schematic diagram of a personal authorisation device 200 in accordance with one embodiment of the invention. The device includes memory 205 which is utilised for holding a pass code 204. In the particular embodiment shown in FIG. 2, the pass code is assumed to be a four digit personal identification number (PIN). However, in other embodiments, the pass code may be any appropriate form of numeric, alphabetical, or alphanumeric character or symbol string.

The value of the PIN 204 stored in memory 205 can be updated using PIN input unit 208. In some implementations, PIN input unit 208 may include a user interface, such as a set of control buttons. This then allows a user to enter a PIN directly into memory 205 of personal authorisation device 200 via PIN input unit 208. In other implementations, personal authorisation device 200 does not itself support direct user input. In this case, PIN input unit 208 represents some form of communications facility in order to receive a PIN being entered from some other system or terminal (not shown in FIG. 2). Such communications may be performed by any suitable communications link, wired or wireless. For example, PIN input unit 208 may allow the personal authorisation device 200 to plug into a terminal in order to receive a PIN from the terminal, such as by a USB connection. Another possibility is that PIN input unit 208 allows a terminal to engage the personal authorisation device using a wireless link such as BlueTooth. In some embodiments, the personal authorisation device may support multiple modes of input—i.e. the personal authorisation device 200 may accept direct user input of a new PIN and/or receipt of a PIN via one or more different communications links.

Personal authorisation device 200 further includes a PIN output unit 210. PIN output unit 210 is used to supply the PIN 204 as stored in memory 205 to some form of reader or terminal for authorisation or validation purposes. PIN output unit 210 can support any suitable form of wired or wireless link, such as USB, Bluetooth, and so on. In some embodiments, PIN output unit 210 may support multiple different forms of output link. Although PIN output unit 210 is shown in FIG. 2 as being separate from PIN input unit 208, in some embodiments PIN output unit 210 may be combined with PIN input unit 208 to form single communications facility to handle both input to (Rx) and output from (Tx) device 200.

In operation, PIN output unit 210 allows a terminal to receive PIN 204 from personal authorisation device 200. The received PIN may be compared with a list of one or more PINs that are permitted access to a particular resource. If a match is found, i.e. the PIN received from personal authorisation device 200 matches an entry in the list, then the user (the bearer of personal authorisation device 200) is assumed to be authorised, and so is granted access to the resource protected by the terminal.

Note that PIN output unit 210 may support various known strategies for protecting the PIN 204. For example, the PIN may be communicated to a terminal in encrypted form or a challenge-response strategy may be used for supplying the PIN. Similar techniques may be utilised for providing the PIN to PIN input unit 208 for storage in memory 205 (where PIN input unit 208 provides a communications interface rather than a direct user input facility). In addition, the PIN 204 stored in memory may be in encrypted form, such as by using a one-way transformation (as described in more detail below).

As previously discussed, known authorisation devices containing PINs are susceptible to theft, whereby an adversary gaining illicit possession of the device is able to access resources in lieu of the proper holder of the device. In accordance with one embodiment of the invention, personal authorisation device 200 incorporates a tamper detector 202 to protect against such theft (or loss) of the device.

In one embodiment, the personal authorisation device 200 is worn by a user, for example as a watch, a bracelet, some form of necklace, an ear-ring, and so on. The tamper detector 202 is arranged so that if the device is removed from the user (i.e. the wearer), this removal is detected by the tamper detector 202. There are various ways in which this detection may be accomplished, depending upon the particular device concerned. For example, a bracelet or watch may be formed into a circuit loop around the wrist, such as by being integrated into the watchstrap. The device is arranged so that it can only be opened and removed from the user's wrist in such a way that the circuit is broken. This then automatically triggers the tamper detector 202.

Various other mechanisms may also be used by the tamper detector 202 to determine when the personal authorisation device 200 is no longer being worn or has been suddenly removed from a user. For example, the tamper detector can monitor the pulse of the wearer. Any abrupt change in the detected strength of the pulse then indicates that the personal authorisation device 200 has changed its position in relation to the wearer. In particular, if the device were removed from a user, the pulse signal would be suddenly lost. Another approach is to measure electrical resistance across the wearer's skin, where a sudden change in measured resistance indicates that the device has been removed from the wearer. It will be appreciated that the tamper detector 202 may support a variety of such approaches.

In practice, the tamper detector is likely to be the component of device 200 that is most susceptible to damage (e.g. consider that watchstraps tend to break more frequently than watches themselves). Accordingly, in one embodiment some level of fault tolerance or redundancy is incorporated into tamper detector 202. For example, if tamper detector is based on the integrity of a circuit loop about a wrist, as for a watchstrap, then the tamper detector may in fact be provided with three such loops. The detector may then only trigger if at least two of the three loops indicate that the device is being removed from the user. In other words, if just one of the loops suffers some accidental damage, then the detector won't trigger. In addition, tamper detector 202 may incorporate a variety of detection mechanisms (e.g. a watch that senses both a closed loop around a wrist and also a user pulse), and only trigger if both mechanisms confirm that the watch is being removed from a user. Of course, it is important that any concessions to fault tolerance do not prevent the tamper detector from reliably indicating whenever the device is indeed removed from a wearer.

If tamper detector 202 does determines that personal authorisation device 200 has been removed from the user/wearer, then it disables the device. In the embodiment shown in FIG. 2, triggering the tamper detector causes the stored PIN 204 to be deleted from memory 205. In another embodiment, triggering the tamper detector 202 may serve to disable the output from memory 205 or from PIN output unit 210. The result is that personal authorisation device 200 can no longer be used for authorisation purposes. In order to re-activate device 200, a new PIN number must be entered via the PIN input unit 208 (or the output re-enabled, depending on the disablement mechanism employed).

It will be appreciated that the use of tamper detector 202 ensures that the personal authorisation device 200 is only usable by someone who knows the correct PIN to store in memory 205. Thus if an adversary somehow acquires the personal authorisation device from the legitimate owner, then tamper detector 202 will have automatically triggered as the device is removed from the owner. The device then becomes unusable for authorisation purposes until a new PIN is entered into the device. This will necessarily overwrite any PIN that was previously stored in memory 205. Consequently, although the personal authorisation device 200 may now be usable in theory, since it has a stored PIN number in memory 205, it is assumed that the adversary does not know the correct PIN to enter. Therefore, any attempt by the adversary to use the personal authorisation device to gain access to a protected resource will fail, because the (newly) stored PIN 204 in memory 205 is incorrect, and so cannot validate the user.

On the other hand, bona fide use of personal authorisation device 200 is readily compatible with tamper detector 202. For example, if the legitimate owner of the personal authorisation device 200 decides to remove overnight the watch, bracelet or other form of device, then this will trigger the tamper detector 202. As a result, the device 200 will initially be unusable the next morning. However, since the legitimate user knows the correct PIN for the device, the user enters the (correct) PIN into memory 205 via PIN input unit 208. This correct PIN then enables the personal authorisation device 200 to be used for its desired purpose, namely to provide authorisation of the user in respect of protected resources.

Memory 205 in device 200 may be implemented by any appropriate storage facility, such as an electrically erasable programmable read only memory (EEPROM), flash memory, a miniaturised disk storage unit and so on. In one particular embodiment, memory 205 is volatile, such as CMOS RAM. This ensures that any loss of power within the device, which could result in the tamper detector 202 being disabled, also results in the loss of the stored PIN 204. (Otherwise, an adversary might remove a battery from device 200, thereby deactivating tamper detector 202, to try to remove device 200 from a user without causing loss of the stored PIN 204).

Figure 3:
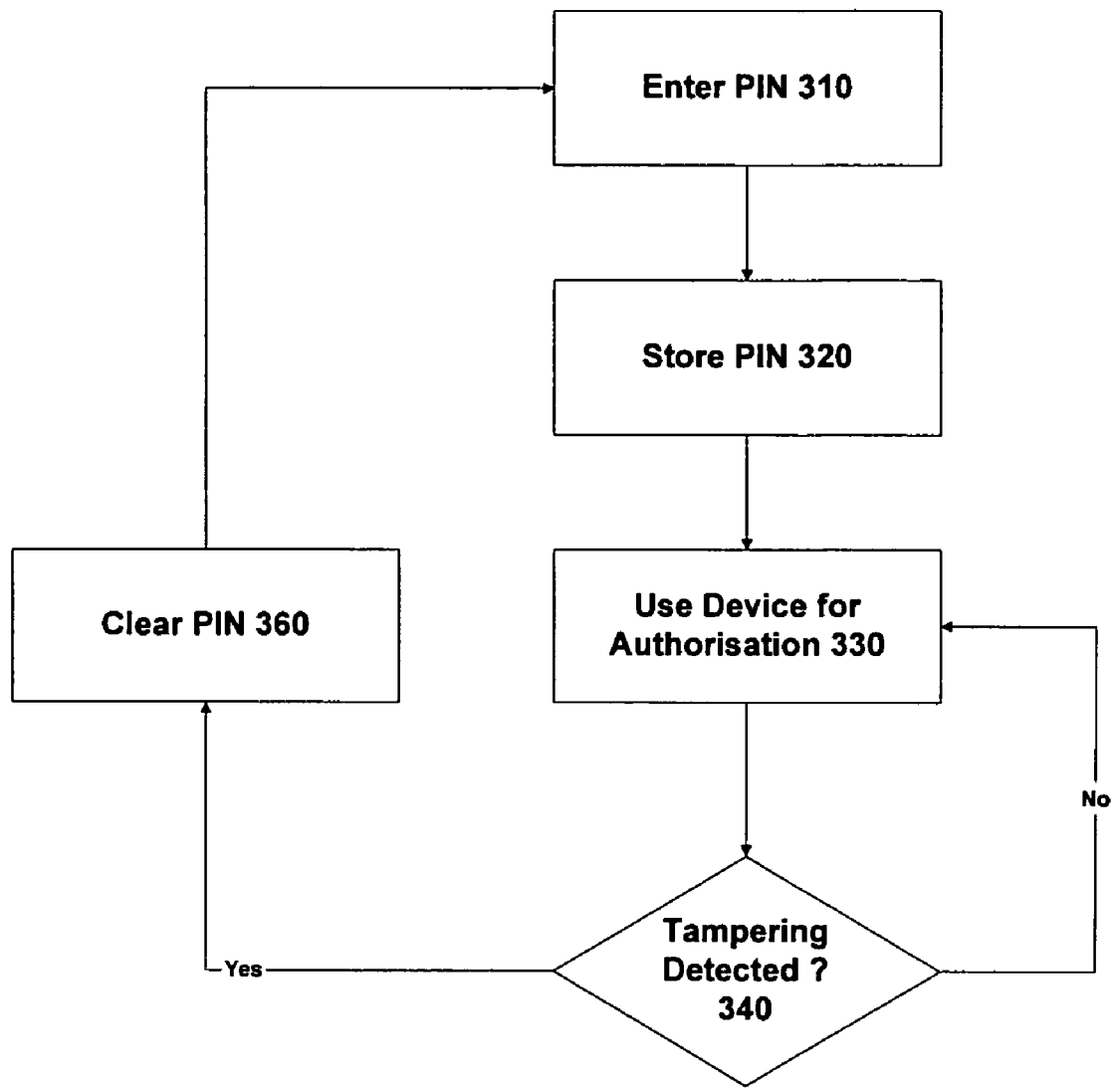
FIG. 3 is a flowchart for using the personal authorisation device of FIG. 2 in accordance with one embodiment of the invention.

FIG. 3 presents a flowchart of operations of personal authorisation device 200 in accordance with one embodiment of the invention. Processing starts with a user entering a PIN into the device (310) which is then stored into the device (320), possibly in a transformed format. The personal authorisation device 200 is now ready for use. For example, the device can be engaged with a terminal, which causes the device to supply the terminal with the PIN that the user entered at operation 310 (330). The device then remains available for use unless tampering is detected (i.e. removal from the user) (340). This causes the device to be disabled (360) so that it can no longer be used for authorisation (as per operation 330). This situation persists until an appropriate PIN is entered again (returning to operation 310), thereby allowing the device to be used once more for authorisation purposes.

Once tamper detector 202 has triggered and deleted the stored PIN 204 (corresponding to operation 360), the circuit may have to be reset before the personal authorisation device can be re-utilised (this reset is not shown in FIG. 3). The details of when and how this reset is performed are dependent upon the particular implementation. For example, in some embodiments, the tamper detector can be regarded as a switch that is "on" when enabling the device and "off" when disabling the device. If the tamper detector is formed within a watchstrap, the "off" state represents when the strap is opened (e.g. to remove from the wearer), and the "on" state represents when the strap is closed (irrespective of whether the watch is on or off a user at this stage). Likewise, if the tamper detector operates by checking proximity to or contact with a human being (such as by monitoring temperature, pulse, etc), then the circuit may be reset if the device is again brought close to the user. In these embodiments, the tamper detection device is automatically reset when the watch is placed back onto a user.

In certain other embodiments as discussed above, triggering of the tamper detector may only disable output of a stored PIN 104 (rather than deleting the stored PIN). In these embodiments, the tamper detector is only reset when a new PIN is entered into device 200. In other words, the tamper detector must continue to disable output of the existing PIN even if the device is placed back onto a user until a new PIN is entered.

In the embodiment of FIG. 2, the personal authentication device may be incapable of storing a PIN 204 if the tamper detector 202 is in its "off" state. For example, memory 205 might represent some form of volatile memory that receives power only when the tamper detector is in its "on" state, so that if the tamper detector is in its "off" state, the memory cannot hold data.

Figure 4:
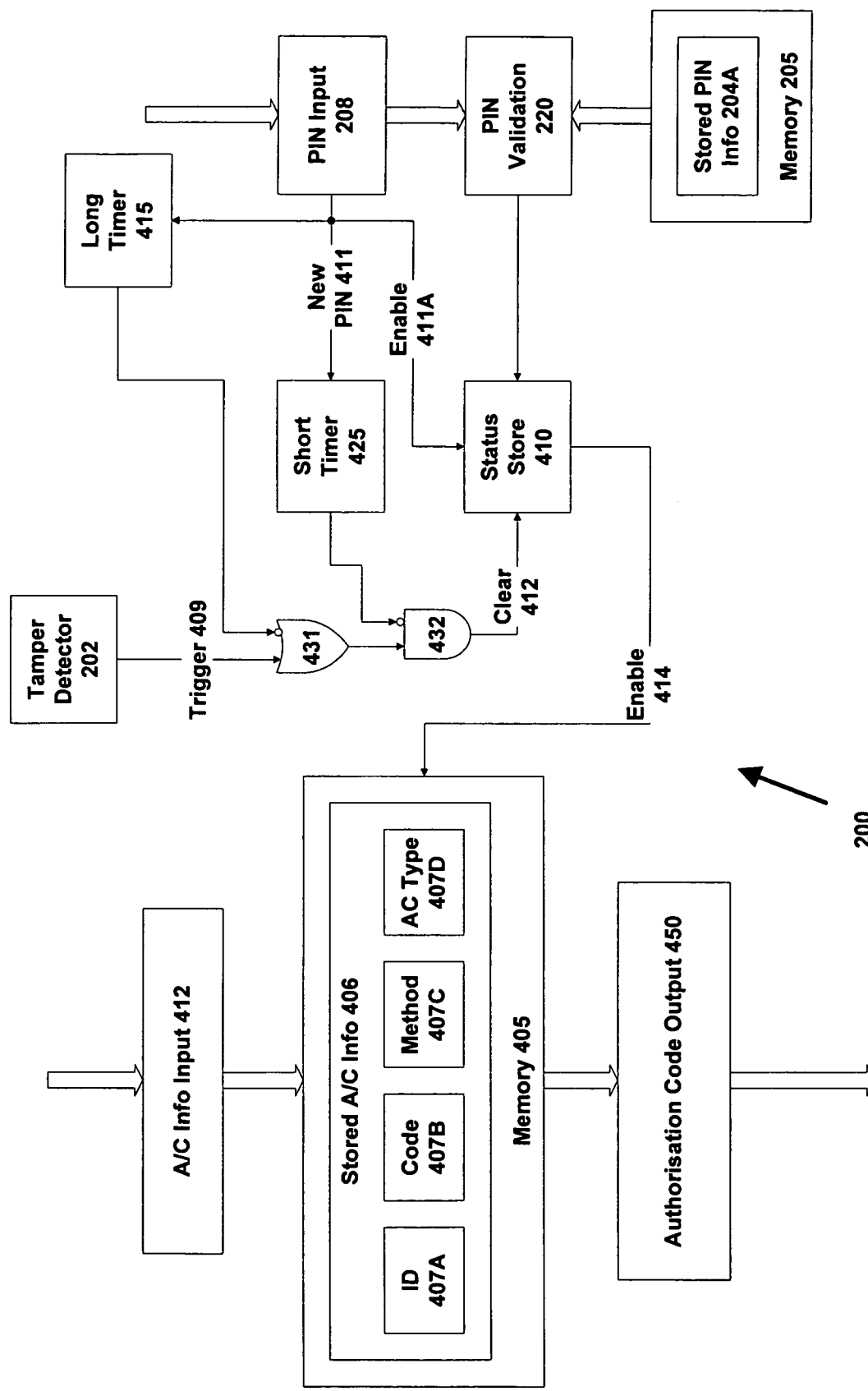
FIGS. 4 and 5 are schematic diagrams of a personal authorisation device in accordance with further embodiments of the invention.

FIG. 4 illustrates another embodiment of personal authorisation device 200. Note that certain components from the embodiment of FIG. 4 are the same as in the embodiment of FIG. 2 (and have like reference numerals). Accordingly, such components generally operate in the same manner as described above with respect to FIG. 2, unless otherwise indicated below.

The personal authorisation device 200 of FIG. 4 includes stored PIN information 204A in memory 205. In general, memory 205 is provided in the form of some read only memory (ROM), and PIN information 204A can be regarded as hard-coded into device 200. In some embodiments, PIN information 204A is hard-coded at manufacture of device 200, although other embodiments may support a facility to update stored PIN information 204A.

In use, the bearer of device 200 enters a PIN into device 200 via PIN input unit 208. As previously discussed in relation to FIG. 2, PIN input unit 208 may comprise any appropriate facility for receiving a PIN into device 200. The PIN input unit 208 is linked to a PIN validation unit 220, which compares the PIN received from a user (via PIN input unit 208) against the stored PIN information 204A. If these two match, the user of device 200 is regarded as authorised, having entered the appropriate PIN, and so PIN validation unit 220 supplies an authorisation signal to status store 410.

In one embodiment stored PIN information 204A may comprise the PIN itself, thereby allowing PIN validation unit 220 to perform a direct comparison with user input. In another embodiment however, stored PIN information 204A comprises a one-way transformation of the correct PIN. The one-way transformation ensures that knowledge of the correct PIN allows the stored PIN information 204A to be derived, but the converse is not true—i.e. it is not possible to derive the correct PIN from knowledge of the stored PIN information 204A. Suitable one-way functions for this purpose are known in the field of encryption. It will be appreciated that in this embodiment, even if an adversary is somehow able to read the contents of memory 205, they are still not able to determine the correct PIN for use with device 200.

In operation, PIN validation unit 220 receives the PIN entered by the user from PIN input unit 208, and transforms the received PIN using the one-way function. PIN validation unit 220 then compares the transformed, user-entered PIN against the stored PIN information 204A in memory 205, and sets status store 410 in accordance with whether or not this comparison detects a match. Status store 410 therefore indicates whether or not the user who entered the PIN is properly authorised with respect to device 200, based on whether or not the correct PIN was entered.

Device 200 further includes a tamper detector 202, which may be implemented and operated as described above in relation to the various embodiments of FIGS. 2 and 3. For example, if tamper detector 202 is triggered, this sends a signal 409, 412 through to status store 410 to clear its status, thereby preventing device 200 from being used for authorisation purposes. This situation persists until a new PIN is received into device 200, whereupon PIN validation unit 220 enters a new status into status store 410 (dependent on the newly-entered PIN).

In one embodiment, PIN input unit 208 produces a new PIN signal 411 whenever a new PIN is received into the device 200. This signal is passed as enable signal 411A to status store 410, and allows the PIN validation unit 220 to update the contents of status store only in response to a new PIN being entered. (N.B. clear signal 412, if set, is effective irrespective of enable signal 411A). In other embodiments, enable signal 411A may be omitted, and PIN validation unit 220 can directly control writing into status store 410.

The embodiment of FIG. 4 also includes two timers, namely a long timer 415 and a short timer 425, which are both set (i.e. started) by new PIN signal 411. In the particular embodiment shown in FIG. 4, it is assumed that each of timers 415 and 425 outputs a low until it is set, whereupon it outputs a high until the timer expires, at which point the output returns to low. (Note that both timers 415 and 425 can be regarded as optional, and other embodiments may omit one or both of them).

Long timer 415 is used to limit the period of validity of the status stored in status store 410. In other words, once the timer 415 has expired, personal authorisation device 200 is disabled, in a similar fashion to that already described in relation to the tamper detector 202 (e.g. through clearing status store 410). This ensures that even if the personal authorisation device 200 is somehow lost or stolen in a manner that manages to avoid triggering the tamper detector 202, then there is only a limited period during which the device can be used illicitly by some adversary. After this period, timer 415 expires, and personal authorisation device 200 can no longer be used.

In the embodiment shown in FIG. 4, the inverted output from timer 415 is passed to OR gate 431, which also receives the trigger signal 409 from tamper detector 202. Accordingly, OR gate 431 produces a positive output whenever the long timer 415 has expired or tamper detector 202 has triggered. Once long timer 415 has expired, the device cannot be used until long timer 415 is reset by new PIN signal 411.

Considering an appropriate initial setting for the value of long timer 415, i.e. the time taken to expire after a PIN has been input into PIN input unit 208, this depends upon the mode of operation of device 200. In one embodiment, it is expected that a user wears device 200 during the day but not at night. In this case the PIN may be (re)entered every morning, and the initial timer setting might be approximately one day. (N.B. this might represent a working day rather than a complete day if the device is intended primarily for use in the workplace). In other circumstances a longer timer setting, such as one week, or possibly a shorter timer setting, corresponding perhaps to one work shift, e.g. a few hours, might be appropriate. A longer timer setting increases convenience (since the user doesn't have to enter the PIN so often), while a shorter timer setting increases security (for example, acting as a backup measure to deactivate the device if the tamper detector were to fail). In some embodiments, a user may be able to alter the timer setting, subject to appropriate security controls. Such a facility might be useful, for example, when travelling, where it may be difficult to locate an appropriate terminal to allow a PIN to be entered.

In one embodiment, timer 415 resets for each new PIN signal 411, even if the timer has not yet expired from a previous PIN entry. One motivation for doing this is to extend the remaining period until the timer expires. This may help to avoid inconvenience, for example if opportunities to enter a PIN (operation 310 in FIG. 3) are restricted to limited times and/or places. Resetting timer 415 in this manner does not compromise security, because the timing extension is only of benefit if the user has entered the correct PIN. (If the user enters an incorrect PIN, then timer 415 may be reset, but the output from PIN validation unit 220 will be negative, thereby preventing the device from authorising the user).

Device 200 may also support some facility to restrict the rate at which new PINs can be entered into the device. For example, if three new PINs have been entered in rapid succession, then the validation of any further PIN input may be prevented until the long timer 415 has expired in respect of the previously entered PIN. This provides a protection against a brute force attack, in which an adversary wants to determine the correct PIN by trying all possible values on a trial and error basis as quickly as possible. In other embodiments, such a protection strategy may be implemented by a special-purpose component on device 200, separate from long timer 415.

In some embodiments, it may be difficult or awkward to enter a PIN into personal authorisation device 200 while it is being worn by a user. For example, the personal authorisation device may have to be removed from the user and inserted into a special terminal for secure PIN entry. Accordingly, the embodiment of FIG. 4 includes short timer 425, which permits a short delay, such as for a few seconds, after entering the PIN, during which time the tamper detector 202 is ineffective. The delay gives a user time to put on the device after entering the PIN without it being immediately disabled by the tamper detector.

More particularly, in the embodiment of FIG. 4, the inverted output of short timer 425 is fed to AND gate 432. The other input into AND gate 432 is the output from OR gate 431, while the output of AND gate 432 is passed as clear signal 412 to status store 410. Short timer 425 is set in response to new PIN signal 411. Accordingly, for the duration of short timer 425, the status in status store 410 is maintained irrespective of the output from tamper detector 202 (and also irrespective of the output from long timer 415, although long timer 415 will not expire anyway before short timer 425 due to their relative time settings). In effect therefore, short timer 425 disables trigger signal 409 from tamper detector 202 after the entry of a new PIN for the duration of short timer 425. After short timer 425 has expired, trigger signal 409 is once again enabled (i.e. it becomes effective to clear status store 410).

In some embodiments, the personal authorisation device is able to output the stored pass code while short timer 425 is running. This facility is useful in circumstances where the tamper detector locks into the "off" state, for example because a watchstrap breaks. In this situation, the personal authorisation device could still be used by entering a PIN immediately prior to each transaction or other use of device 200. The status from this PIN will then be maintained in status store 410 for the duration of short timer 425, and this may be long enough to complete the desired transaction (the setting of short timer 425 could be determined with such a situation in mind). In other embodiments however, the personal authorisation device may be disabled (i.e. enable signal 414 could be suppressed) while short timer 425 is running.

In the embodiment of FIG. 4, short timer 425 uses logic (AND gate 432) to disable trigger signal 409 (temporarily). However, as mentioned above, in some embodiments tamper detector 202 may be designed to engage at a more fundamental level with the operation of status store 410. For example, status store 410 may comprise volatile memory, and tamper detector 202 may be part of the power supply circuit to the store 410. In such circumstances, short timer 425 may have to compensate for the "off" state of tamper detector 202. For example, short timer might be implemented using a capacitor, which supplies power to maintain status information in volatile status store 402 for the appropriate period until the timer expires. Alternatively, the PIN input procedure may itself supply sufficient power to maintain the contents of status store 410 for the delay period of short timer 425 (but no longer).

The device 200 of FIG. 4 further includes memory 405 for storing account information 406. Note that memory 405 may be separate from memory 205 (as shown in FIG. 4), or they may be implemented together as a single unit. Account information 406 allows device 200 to be used to gain access to one or more accounts, each corresponding to a protected resource (not necessarily finance-related). For example, one account may comprise a credit card account, another account may provide access to a building or car park, another account may allow activation of a vehicle, and another account may provide access to various computing resources, such as data files, email, etc.

The skilled person will be aware of various mechanisms for entering and updating the account information into device 200, such as by preloading at manufacture, and/or by using some appropriate form of terminal to load onto the device 200. Such loading may be achieved via account information input unit 412, which may be implemented in common (at least in part) with PIN input unit 208.

In the embodiment of FIG. 4, the information for each account comprises four items. The first is an ID, corresponding typically to an account number or user ID for an account 407A; the second is a pass code 407B to authorise access to the account; the third is a method (i.e. set of one or more procedures and/or data structures) 407C indicating the protocol and/or format required to interact with the account, and the fourth is an account type 407D. It will be appreciated not all of these four items need to be present for all fields. For example, car park access may be based simply on an authorisation code 407B, and may not have any user ID 407A.

Device 200 interacts with a terminal via an authorisation code output unit 450 to supply the relevant authorisation code 407B. The skilled person will be aware of various mechanisms for device 200 to select the appropriate authorisation code for supply in any given situation. For example, the device may know that a particular account type is to be used with a particular type of terminal. Alternatively, the terminal itself may specify the account type to be used in a transaction. Note that method information 407C can be used to control how the device determines which account to utilise for any given session with a particular terminal.

Once the account type for a transaction has been identified, the device 200 may supply to the terminal the user ID 407A to identify the particular account to be utilised. In addition, the device 200 can supply the terminal with the corresponding authorisation code 407B, in order to validate access to the account specified by user ID 407A. Note that the authorisation code 407B is generally supplied from the device in encrypted form, such as by using a challenge-response strategy, to minimise the risk of divulgation to eavesdroppers. Assuming that the terminal accepts the user ID 407A and the authorisation code 407B supplied by the device 200, the user is permitted to proceed with the transaction.

It will be appreciated that there are many possible variations on the embodiment of FIG. 4. For example, the enable signal 414 from status store 410 might act on authorisation code output unit 450, instead of (or as well as) on stored account information 406. Note also that the output from status 410 could be arranged to be positive (enabling output only when present) or negative (disabling output whenever present).

In one embodiment, the output from status store 410 could be provided directly as the output of device 200, without the use of stored account information 406. In other words, device 200 would obtain access to a resource if status store 410 indicated via enable signal 414 that the user had entered the correct PIN. This approach would be appropriate where there is no need to store detailed information about multiple individual accounts.

It will be appreciated that various aspects of the embodiments shown in FIGS. 2 and 4 can be combined as appropriate. For example, the embodiment shown in FIG. 2 might be supplemented by a short timer 425 and/or a long timer 415.

Note that in the embodiment illustrated in FIG. 4, the PIN entered by a user through PIN input unit 208 is not stored, rather it is compared to the already stored PIN information 204A, and the results of this comparison (match or no match) are then saved by PIN validation unit 220 into status store 410. In another embodiment, the PIN entered by a user through PIN input unit 208 may be stored in memory (potentially after transformation via a one-way function), analogous to the embodiment of FIG. 2. In this approach, PIN validation unit 220 comprises logic to perform a comparison between the two PINs stored in the device, but does not save the result of the comparison. Instead, the (ongoing) result of the comparison can be used to provide enable signal 414. Note that in this embodiment, triggering of the tamper detector 202 and/or timer 415 may cause deletion of the stored PIN (the one entered by the user via PIN input unit 208) in order to disable personal authorisation device 200.

Figure 5:
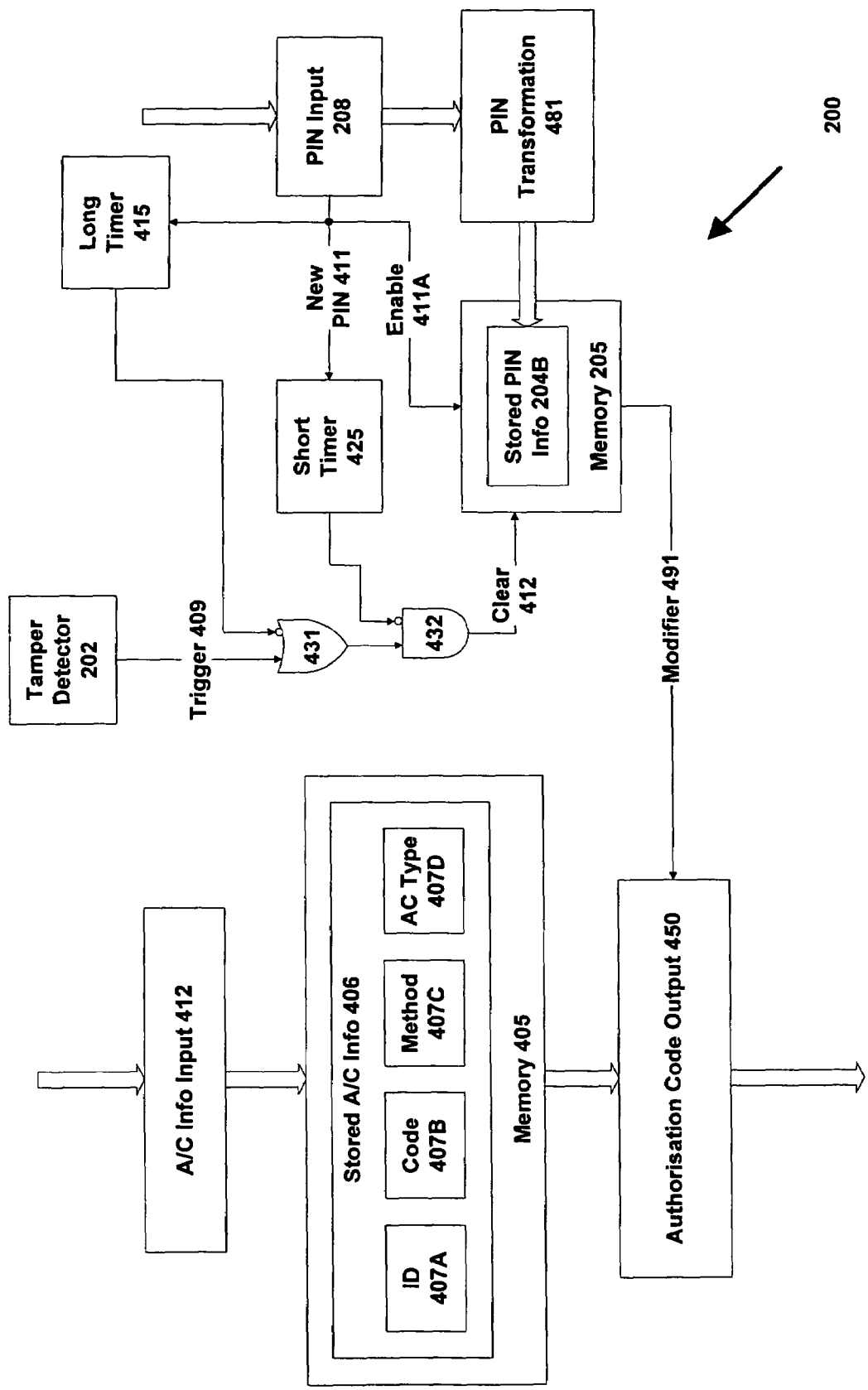

FIG. 5 illustrates an alternative embodiment of the invention. Note that this embodiment has many components in common with the embodiment of FIG. 4, and these will generally operate in the same manner as described above unless otherwise indicated. In the embodiment of FIG. 5, there is no pre-entered "correct" stored PIN information 204A. Rather, the user PIN entered via PIN unit 208 is subject to a one-way transformation such as discussed above by PIN transformation unit 481, and the result is stored as PIN information 204B into memory 205. The stored PIN information 204B remains in memory 205 until deleted by clear signal 412, which is generated as described above in relation to FIG. 4. This then disables the device 200 until a new PIN is entered.

The output from memory 205 is not a yes/no enable signal (as in the embodiment of FIG. 4) but rather a modifier 491, which comprises, or is derived from, stored PIN information 204B. The modifier is used to transform authorisation code 407B (and optionally other stored account information 406) as it is output from device 200. If the modifier is incorrect, the transformed authorisation code will be invalid, because it no longer corresponds to the associated account ID 407A, and/or because it no longer represents a valid authorisation code. (The latter situation implies that the set of valid authorisation codes is sparsely distributed over the set of all possible authorisation codes). The skilled person will be aware of various suitable mathematical functions to use for transforming code 407B using modifier 491. For example, modifier 491 could be used as a key to encrypt code 407B (or vice versa), and will typically be a one-way function (such as used in PIN transformation unit 481).

Note that the exact method of combining modifier 491 and code 407B may vary from one account to another, and can be specified by method information 407C. In addition, some accounts on device 200 may use modifier 491, while other accounts on device 200 may use an enable signal instead (such as described in relation to FIG. 4).

Figure 6:
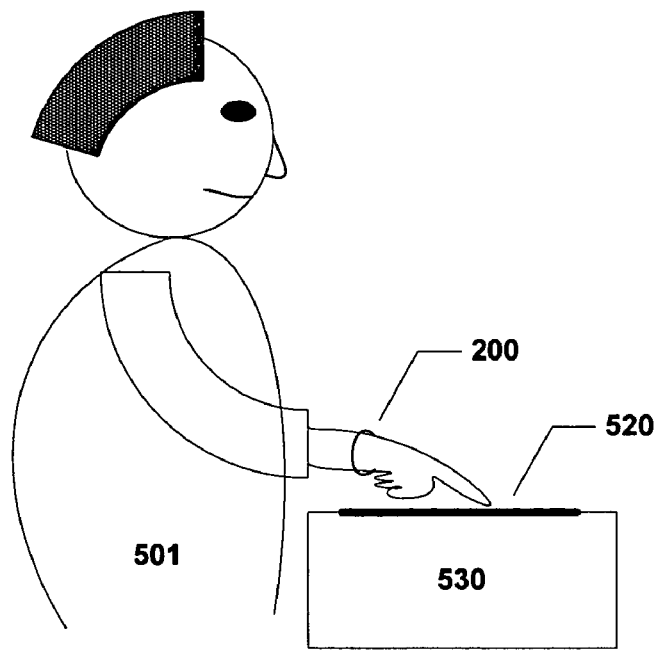
FIG. 6 is a schematic diagram of using a terminal to enter a pass code into a personal authorisation device in accordance with one embodiment of the invention.

FIG. 6 illustrates a user 501 loading a PIN or other pass code into a personal authorisation device 200 in accordance with one embodiment of the invention (i.e. this corresponds to operation 310 in FIG. 3). In the illustrated embodiment, a terminal 530 is used to enter the PIN into device 200. However, as previously mentioned, in some embodiments, it is possible to enter the PIN directly into personal authorisation device 200 without the use of the terminal, for example, personal authorisation device 200 may be provided with input buttons (such as on a watch) in order to perform this input.

In the embodiment shown, personal authorisation device 200 and terminal 530 communicate via a wireless link, such as by using high frequency radio waves. This link is automatically activated when personal authorisation device 200 is brought into proximity with terminal 530, as is known in the art. In other embodiments, communications between terminal 530 and personal authorisation device 200 may require some physical link between the two. Note that if appropriate, various forms of encryption may be used for communications between the terminal 530 and personal authorisation device 200.

Terminal 530 is equipped with a keyboard or keypad 520. Keypad 520 allows user 501 to input the PIN (plus any other appropriate information and/or commands) into terminal 530. Terminal 530 can then forward the PIN to personal authorisation device 200.

In one implementation, it is expected that user 501 enters a PIN into personal authorisation device 200 on a daily basis. For example, user 501 may remove personal authorisation device 200 at bedtime each evening, with the PIN then having to be re-entered the following morning. In this situation, the terminal can be located at the home of the user 501. This is a secure environment, in that it is very difficult for an adversary to monitor (visually or otherwise) the user input into terminal 530 to gain illicit knowledge of the PIN.

Many other implementations are possible, depending upon the particular usage of personal authorisation device 200. For example, terminal 530 might be located at a workplace. User 501 can then utilise terminal 530 at the start of the working day to enter an appropriate PIN into personal authorisation device 200. The device 200 can then be used during the remainder of the day to access various resources at the workplace, such as restricted areas of the building, car parks, computer systems, vending machines, and so on. Terminal 530 can be carefully designed and located so that visual or other monitoring of PIN input by an adversary is impracticable.

Another possible implementation is where terminal 530 is installed at a trusted location, such as a bank. The PIN may then be entered into personal authorisation device 200 using terminal 530, for example to support various financial transactions during the day such as credit card purchases, ATM cash withdrawals, and so on. Again terminal 530 can be designed and located to minimise the risk of an adversary monitoring or intercepting PIN input.

Figure 7:
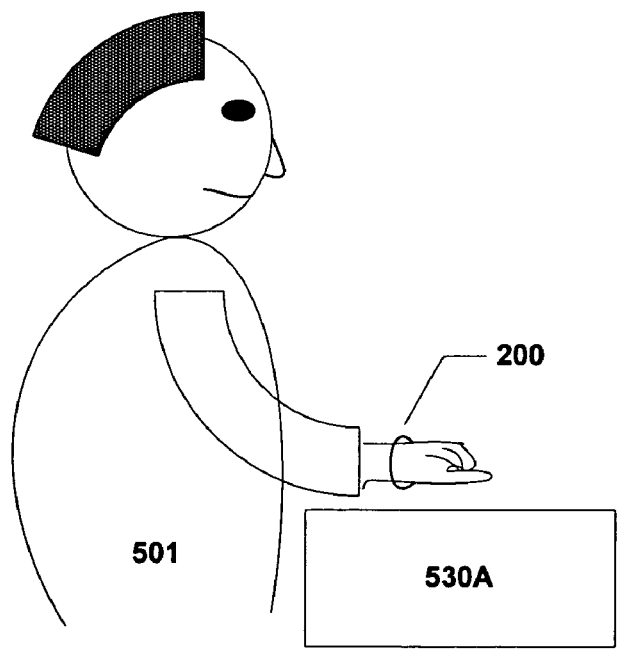
FIG. 7 is a schematic diagram of using a personal authorisation device to enter a pass code into a terminal in accordance with one embodiment of the invention.

FIG. 7 illustrates the use of personal authorisation device 200 to provide a PIN or other authorisation code to terminal 530A in order to gain access to some resource protected by terminal 530A (i.e. FIG. 7 corresponds to operation 330 in FIG. 3). It will be appreciated that a very wide range of resources may be protected in this manner by terminal 530A, including financial transactions (such as by credit card), access to computer resources (including on-line services), access to buildings, and so on.

In the embodiment shown in FIG. 7, the interaction between personal authorisation device 200 and terminal 530A is via a wireless link, as is well known in the art. This permits a user some flexibility in positioning device 200 in relation to terminal 530A. The interaction between the personal authorisation device 200 and the terminal 530A includes the device 200 supplying a PIN or other authorisation code to terminal 530A (depending upon the particular embodiment, such as shown in FIG. 2 FIG. 4, or FIG. 5). If the supplied PIN is correct, terminal 530A grants the bearer of device 200 (i.e. user 501) access to the protected resource(s). Of course, during the transaction the user 501 may have to enter some information and/or instructions other than the PIN directly into terminal 530A (such as a confirmation that the transaction should proceed), but this other information and/or instructions is less sensitive than the PIN itself.

It will be appreciated that there may be a very wide variety and large number of terminals 530A. Accordingly, it is likely that not all terminals 530A are at a protected location. For example, some terminals may be in a relatively public place, and so provide only limited shielding (if any) from third party viewing. However, since user 501 does not have to enter a PIN into terminal 530A at the time of the authorisation of FIG. 7, there is no opportunity at this stage for an adversary to gain knowledge of the PIN by watching user 501.

One benefit of the approach described herein is that the number of times that a user actually has to enter the PIN at a terminal is greatly reduced (for example, just once per day, rather than for every individual authorisation). Not only does this improve security (since a user entering a PIN represents a relative weak-spot in the authorisation process), but it also enhances convenience for a user.

The approach described herein reduces vulnerability to eavesdropping, sniffer programs, and other forms of attack. Thus terminal 530, as illustrated in FIG. 6, can be designed and located with a particular focus on security. For example, terminal 530 may be disconnected from any public network, thereby minimising the risk of a sniffer program being present. In addition, encryption may be used for communications between the terminal 530 and device 200 in order to thwart eavesdroppers.

Although a transaction such as shown in FIG. 7 may not be performed in such a secure environment as that of FIG. 6, user 501 does not have to enter a PIN or other authorisation code at this point. Rather, communications between terminal 530A and device 200 based on data stored within device 200 can adopt various known strategies to protect against eavesdroppers, sniffer programs and the like. For example, terminal 200 can use a challenge-response strategy (as is in the art) to provide an authorisation code to terminal 530A. This avoids terminal 530A ever receiving a (clear) authorisation code from device 200, but nevertheless still allows terminal 530A to validate device 200 based on certain encrypted transmissions.

In conclusion, a variety of particular embodiments have been described in detail herein, but it will be appreciated that this is by way of exemplification only. The skilled person will be aware of many further potential modifications and adaptations that fall within the scope of the claimed invention and its equivalents.

What is claimed is:

1. A personal authorisation device wearable by a user, comprising:
   a memory;
   an input operable to receive user authentication data for authenticating the user, wherein the personal authorisation device is configured to generate validation information from said user authentication data by transforming said user authentication data via a one-way transformation, wherein said validation information comprises a result of said one-way transformation, wherein said user authentication data is not stored within said memory;
   wherein the memory stores an authorisation code and said validation information generated from the user authentication data, wherein said personal authorisation device is configured to encrypt said authorisation code with an encryption key to generate an encrypted authorisation code, wherein said encryption key comprises said validation information generated from said user authentication data; and
   an output operable to provide said encrypted authorisation code to an other device configured to protect a resource, wherein said personal authorisation device is configured to enable the user to gain access to the protected resource, wherein to enable the user to gain access to the protected resource comprises providing said encrypted authorisation code to the other device through said output, wherein said other device and said resource are external to the personal authorisation device; and
   a tamper detector configured to trigger if the personal authorisation device is removed from said user, wherein in response to said triggering the tamper detector is configured to disable use of the personal authorisation device, wherein to disable use of the personal authorisation device comprises preventing output of said encrypted authorisation code subsequent to said triggering.

2. The personal authorisation device of claim 1, wherein the personal authorisation device is configured to compare the validation information to PIN information stored in the personal authorisation device to determine whether the validation information is the same as the PIN information stored in the personal authorisation device, wherein the personal authorisation device comprises a status indication that indicates whether the validation information is the same as the PIN information stored in the personal authorisation device.

3. The personal authorisation device of claim 1, wherein the tamper detector disables use of the personal authorisation device by deleting the validation information stored in the memory.

4. The personal authorisation device of claim 1, further comprising a timer, wherein the personal authorisation device is configured prevent output of said encrypted authorisation code in response to expiry of the timer.

5. The personal authorisation device of claim 4, wherein the timer disables use of the personal authorisation device by deleting the validation information stored in the memory.

6. The personal authorisation device of claim 4, wherein the timer is reset when new user authentication data is received at the input.

7. The personal authorisation device of claim 4, wherein the timer has a duration of approximately one day.

8. The personal authorisation device of claim 1, wherein the personal authorisation device stores one or more other authorisation codes.

9. The personal authorisation device of claim 2, wherein the personal authorisation device stores one or more other authorisation codes, wherein said personal authorisation device is operable to encrypt each of said one or more other authorisation codes with said encryption key to generate respective encrypted authorisation codes, wherein the personal authorisation device is configured to provide one of the respective encrypted authorisation codes as output in response to determining that said status indication indicates that said validation information is the same as the PIN information stored in the personal authorisation device.

10. The personal authorisation device of claim 8, wherein said personal authorisation device is operable to:
    encrypts a particular one of said one or more other authorisation codes with said encryption key to generate a corresponding encrypted authorisation code; and
    provide said corresponding encrypted authorisation code to the other device through said output.

11. The personal authorisation device of claim 8, wherein different ones of said one or more other authorisation codes are associated with different account types, and wherein the personal authorisation device is configured to:
    determine a particular account type specified by a terminal to which the personal authorisation device is communicatively coupled;
    select a particular authorisation code of said one or more other authorisation codes, wherein the particular one of said different account types to which the particular authorisation code is associated is the same as said particular account type specified by said terminal;
    encrypt said particular authorisation code with said encryption key to generate a particular encrypted authorisation code; and
    provide said particular encrypted authorisation code to said terminal via said output.

12. The personal authorisation device of claim 1, further comprising a timer that is set whenever user authentication data is received at the input, and wherein the tamper detector is inoperable to disable use of the personal authorisation device until expiry of the timer.

13. The personal authorisation device of claim 12, wherein said timer has an expiry period of a few seconds.

14. The personal authorisation device of claim 1, wherein said personal authorisation device comprises a necklace.

15. The personal authorisation device of claim 1, wherein said personal authorisation device comprises a bracelet.

16. The personal authorisation device of claim 1, wherein said personal authorisation device comprises a wristwatch.

17. The personal authorisation device of claim 16, wherein said input comprises a set of buttons on the wristwatch.

18. The personal authorisation device of claim 1, wherein said input comprises a wireless interface.

19. The personal authorisation device of claim 1, wherein the tamper detector includes an electric circuit, and wherein the tamper detector is configured to trigger when the electric circuit is broken to remove the personal authorisation device from the wearer.

20. The personal authorisation device of claim 19, wherein the electric circuit is arranged to loop around the wearer's wrist.

21. A method of providing an authorisation code from a personal authorisation device wearable by a user, comprising:
    receiving user authentication data;
    generating validation information from said user authentication data by transforming said user authentication data via a one-way transformation, wherein said validation information comprises a result of said one-way transformation, wherein said user authentication data is not stored within a memory of said personal authorisation device;

storing said validation information generated from the user authentication data in said memory of the personal authorisation device;

accessing an authorisation code stored in said memory of the personal authorisation device and encrypting said authorisation code with an encryption key to generate an encrypted authorisation code, wherein said encryption key comprises said validation information generated from said user authentication data;

enabling the user to gain access to a protected resource that is protected by an other device, wherein said enabling comprises providing said encrypted authorisation code as output from the personal authorisation device to said other device, wherein said other device and said resource are external to the personal authorisation device;

detecting if the personal authorisation device is removed from the user wearing the personal authorisation device; and disabling use of the personal authorisation device in response to detecting such removal, wherein said disabling comprises preventing the output of said encrypted authorisation code.

22. The method of claim 21, wherein the method comprises comparing the validation information to PIN information stored in the personal authorisation device to determine whether the validation information is the same as the PIN information stored in the personal authorisation device wherein the method further comprises providing a status indication that indicates whether the validation information is the same as the PIN information stored in the personal authorisation device.

23. The method of claim 21, wherein said disabling use of the personal authorisation device comprises deleting the stored validation information from said memory.

24. The method of claim 21, wherein the method further comprises:
providing a timer; and
preventing output of said encrypted authorisation code in response to expiry of the timer.

25. The method of claim 24, wherein preventing output of said encrypted authorisation code comprises deleting the stored validation information.

26. The method of claim 24, further comprising resetting the timer when new user authentication data is entered.

27. The method of claim 24, wherein the timer has a duration of approximately one day.

28. The method of claim 21, further comprising storing one or more other authorisation codes in the personal authorisation device.

29. The method of claim 22, wherein the personal authorisation device stores one or more other authorisation codes, wherein the method further comprises encrypting each of said one or more other authorisation codes with said encryption key to generate respective encrypted authorisation codes, wherein the method further comprises providing one of the respective encrypted authorisation codes as output in accordance response to determining that said status indication indicates that said validation information is the same as the PIN information stored in the personal authorisation device.

30. The method of claim 28, further comprising:
encrypting a particular one of said one or more other authorisation codes with said encryption key to generate a corresponding encrypted authorisation code; and
providing said corresponding encrypted authorisation code as output to the other device.

31. The method of claim 28, wherein different ones of said one or more authorisation codes are associated with different account types, and wherein said method further comprises:
receiving an indication of an account type specified by a terminal;
determining a particular authorisation code of the one or more other authorisation codes, wherein the particular one of said different account types to which the particular authorisation code is associated is the same as said particular account type specified by said terminal;
encrypting said particular authorisation code with said encryption key to generate a particular encrypted authorisation code; and
providing said particular encrypted authorisation code as output to the terminal.

32. The method of claim 21, wherein the method further comprises receiving additional user authentication data, wherein the personal authorisation device further comprises a timer, wherein the method further comprises setting the timer in response to receiving said additional user authentication data, and wherein said disabling use of the personal authorisation device is not performed before expiry of the timer.

33. The method of claim 32, wherein said timer has an expiry period of a few seconds.

34. A personal authorisation device wearable by a user, comprising:
means for receiving user authentication data;
means for generating validation information from said user authentication data by transforming said user authentication data via a one-way transformation, wherein said validation information comprises a result of said one-way transformation, wherein said user authentication data is not stored within said personal authorisation device;
means for storing said validation information generated from the user authentication data in the personal authorisation device;
means for accessing an authorisation code stored in the personal authorisation device and encrypting said authorisation code with an encryption key to generate an encrypted authorisation code, wherein said encryption key comprises said validation information generated from said user authentication data;
means for enabling the user to gain access to a protected resource that is protected by an other device, wherein said enabling comprises providing said encrypted authorisation code as output from the personal authorisation device to said other device, wherein said other device and said resource are external to the personal authorisation device;
means for detecting if the personal authorisation device is removed from the user wearing the personal authorisation device; and
means for disabling use of the personal authorisation device in response to detecting such removal, wherein said disabling comprises preventing the output of said encrypted authorisation code.

* * * * *

UNITED STATES PATENT AND TRADEMARK OFFICE
CERTIFICATE OF CORRECTION

PATENT NO. : 7,571,468 B1  Page 1 of 1
APPLICATION NO. : 10/818988
DATED : August 4, 2009
INVENTOR(S) : Emrys J. Williams It is certified that error appears in the above-identified patent and that said Letters Patent is hereby corrected as shown below:

Claim 10, col. 16, line 12, please delete "encrypts" and insert --encrypt-- in place thereof.

Claim 29, col. 17, lines 62-63, please delete "accordance".

Signed and Sealed this

Twenty-ninth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,571,468 B1
APPLICATION NO. : 10/818988
DATED : August 4, 2009
INVENTOR(S) : Emrys J. Williams It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 861 days.

Signed and Sealed this

Seventh Day of September, 2010

David J. Kappos
*Director of the United States Patent and Trademark Office*